(12) United States Patent
Liang et al.

(10) Patent No.: US 10,864,134 B2
(45) Date of Patent: Dec. 15, 2020

(54) LINKAGE MECHANISM AND WALKING AID DEVICE

(71) Applicant: Wistron Corporation, New Taipei (TW)

(72) Inventors: Chen-Yi Liang, New Taipei (TW); Ming-Ru Syue, New Taipei (TW); Ming-Ju Hsieh, New Taipei (TW); Cheng-Hsing Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 179 days.

(21) Appl. No.: 15/784,194

(22) Filed: Oct. 16, 2017

(65) Prior Publication Data

US 2019/0046389 A1    Feb. 14, 2019

(30) Foreign Application Priority Data

Aug. 10, 2017   (TW) .............................. 106127013 A

(51) Int. Cl.
*A61H 3/04* (2006.01)
*F16H 1/20* (2006.01)
(Continued)

(52) U.S. Cl.
CPC ............... *A61H 3/04* (2013.01); *A61G 5/021* (2013.01); *A61G 5/025* (2013.01); *B62K 13/08* (2013.01);
(Continued)

(58) Field of Classification Search
CPC . A61H 3/04; B62B 7/06; A47D 13/04; A47D 13/043
(Continued)

(56) References Cited

U.S. PATENT DOCUMENTS 5,020,560 A * 6/1991 Turbeville ............... A61H 3/04
                                                                    135/67
5,123,665 A * 6/1992 Levy ....................... B62B 3/022
                                                                    211/201
(Continued)

FOREIGN PATENT DOCUMENTS

CN    201542847    8/2010
CN    102802583    11/2012
(Continued)

OTHER PUBLICATIONS

"Office Action of Taiwan Counterpart Application", dated Aug. 13, 2018, p. 1-p. 11.

(Continued)

*Primary Examiner* — Jeffrey J Restifo
(74) *Attorney, Agent, or Firm* — JCIPRNET

(57) ABSTRACT

A linkage mechanism including a base, a first linkage, a second linkage and a driving element is provided. The first linkage has a first end portion and a second end portion opposite to each other, and the first end portion is pivoted to the base. The second linkage has third end portion and a fourth end portion opposite to each other, wherein the third end portion is coupled to the base, and the second end portion and the fourth end portion are coupled with each other. The driving element is coupled to at least one of the second end portion and the fourth end portion, and is configured to drive the first linkage and the second linkage to move relative to the base. A walking aid device is also provided.

34 Claims, 14 Drawing Sheets

(51) Int. Cl.
*A61G 5/02* (2006.01)
*F16H 3/02* (2006.01)
*B62K 13/08* (2006.01)
*B62K 15/00* (2006.01)

(52) U.S. Cl.
CPC ............. B62K 15/008 (2013.01); F16H 1/20 (2013.01); F16H 3/02 (2013.01); *A61G 5/02* (2013.01); *A61H 2003/043* (2013.01); *A61H 2201/0161* (2013.01); *A61H 2201/0192* (2013.01)

(58) Field of Classification Search
USPC .......................................... 280/87.021, 87.05
See application file for complete search history.

(56) References Cited

U.S. PATENT DOCUMENTS

| | | | | |
|---|---|---|---|---|
| 5,538,268 | A * | 7/1996 | Miller | A61H 3/04 280/87.041 |
| 5,803,103 | A * | 9/1998 | Haruyama | A61H 3/04 135/67 |
| 5,816,593 | A * | 10/1998 | Che | A61H 3/04 280/87.041 |
| 6,099,002 | A * | 8/2000 | Uchiyama | A61H 3/04 135/67 |
| 6,343,802 | B1 * | 2/2002 | Workman | A61H 3/008 135/67 |
| 6,503,176 | B2 * | 1/2003 | Kuntz | A61H 3/04 482/51 |
| 6,733,018 | B2 * | 5/2004 | Razon | A61H 3/008 135/67 |
| 7,073,801 | B2 * | 7/2006 | Sanders | A61H 3/04 280/47.4 |
| 7,111,856 | B1 * | 9/2006 | Graham | A61H 3/04 135/67 |
| 7,182,179 | B2 * | 2/2007 | Tolfsen | A61H 3/04 135/85 |
| 7,422,550 | B1 * | 9/2008 | Pinero | A61H 3/008 135/65 |
| 7,445,217 | B1 * | 11/2008 | Price | A61H 3/04 135/67 |
| 7,484,740 | B2 * | 2/2009 | Miller | A61H 3/04 135/65 |
| 7,494,138 | B2 * | 2/2009 | Graham | A61G 5/08 280/304.5 |
| 7,669,863 | B2 * | 3/2010 | Steiner | A61G 5/14 280/250.1 |
| 7,837,208 | B2 * | 11/2010 | Willis | A61H 3/04 280/642 |
| 8,468,622 | B2 * | 6/2013 | Purwar | A61G 7/1017 297/5 |
| 8,562,007 | B2 * | 10/2013 | Menichini | A61H 3/04 135/67 |
| 8,955,871 | B2 | 2/2015 | Takamoto et al. | |
| 9,016,715 | B2 * | 4/2015 | Moliner | A61G 5/042 180/907 |
| 9,022,413 | B2 * | 5/2015 | Liu | A61H 3/04 280/651 |
| 9,226,868 | B2 * | 1/2016 | Andersen | A61H 3/04 |
| 9,414,987 | B2 * | 8/2016 | Bagheri | A61H 3/008 |
| 9,585,807 | B2 * | 3/2017 | Fellingham | A61H 3/04 |
| 9,657,770 | B2 * | 5/2017 | Moller | A61H 3/04 |
| 10,080,700 | B1 * | 9/2018 | Bagheri | A61H 3/04 |
| 10,080,701 | B1 * | 9/2018 | Bagheri | A61H 3/04 |
| 10,307,321 | B2 * | 6/2019 | Pan | A61H 1/00 |
| 2012/0133113 | A1 | 5/2012 | Takamoto et al. | |
| 2016/0151230 | A1 | 6/2016 | Bagheri | |

FOREIGN PATENT DOCUMENTS

| | | |
|---|---|---|
| CN | 105105990 | 12/2015 |
| TW | 201304760 | 2/2013 |

OTHER PUBLICATIONS

"Office Action of China Counterpart Application", dated Jun. 2, 2020, p. 1-p. 14.

* cited by examiner

LINKAGE MECHANISM AND WALKING AID DEVICE

CROSS-REFERENCE TO RELATED APPLICATION

This application claims the priority benefit of Taiwan application serial no. 106127013, filed on Aug. 10, 2017. The entirety of the above-mentioned patent application is hereby incorporated by reference herein and made a part of this specification.

BACKGROUND OF THE INVETION

Field of the Invention

The invention relates to a linkage mechanism and a walking aid device, and particularly relates to a linkage mechanism and a walking aid device using the linkage mechanism.

Description of Related Art

To satisfy demands of the rehabilitation and medical care market, currently available wheelchairs or walking aid devices are used to aid people who have difficulties in walking or those undertaking rehabilitation after surgeries or illness. The commonly seen wheelchairs are mainly provided for users to sit thereon and driven to travel in an electrical or a manual manner. The commonly seen walking aid devices mainly function in allowing the users to hold a handle thereof by hands, such that the user can be supported during the travelling process to push the walking aid device to travel, thereby reducing the burden of walking.

The commonly seen wheelchairs have disadvantages such as heavy weight, uneasy for accommodation and inconvenient for carrying and are not suitable for aiding the users to walk. The commonly seen walking aid devices, even though having advantages such as light weight, easy for accommodation and convenient for carrying, cannot allow the users to ride thereon.

SUMMARY OF THE INVETION

The invention provides a linkage mechanism and a walking aid device using the linkage mechanism which can be easily operated.

A linkage mechanism of the invention includes a base, a first linkage, a second linkage and a driving element. The first linkage has a first end portion and a second end portion opposite to each other, and the first end portion is pivoted to the base. The second linkage has a third end portion and a fourth end portion opposite to each other, wherein the third end portion is coupled to the base, and the second end portion and the fourth end portion are coupled with each other. The driving element is coupled to at least one of the second end portion and the fourth end portion. The driving element is configured to drive the first linkage and the second linkage to move relative to the base.

In an embodiment of the invention, the base has a first sliding guide portion, and the third end portion of the second linkage is slidably disposed in the first sliding guide portion.

In an embodiment of the invention, the linkage mechanism further includes a linking element pivoted to the second linkage. The linking element has a second sliding guide portion, the first linkage further has a coupling portion located between the first end portion and the second end portion, and the coupling portion is slidably disposed in the second sliding guide portion.

In an embodiment of the invention, the linking element is pivoted to the first linkage. The second linkage is a retractable rod and has a second sliding guide portion. The linking element has a coupling portion, and the coupling portion is slidably disposed in the second sliding guide portion.

In an embodiment of the invention, the second linkage has a first rod member and a second rod member pivoted to each other, the first rod member has the third end portion, and the second rod member has the fourth end portion. The linkage mechanism further comprises a linking element, and the third end portion is coupled to the linking element and coupled to the base through the linking element.

In an embodiment of the invention, the base has a first sliding guide portion, the linking element has a first coupling portion, a second coupling portion and a second sliding guide portion located between the first coupling portion and the second coupling portion, and the first linkage further has a third sliding guide portion located between the first end portion and the second end portion. The first coupling portion is slidably disposed in the first sliding guide portion, the second coupling portion is slidably disposed in the third sliding guide portion, and the third end portion is slidably disposed in the second sliding guide portion.

In an embodiment of the invention, the second linkage has a first rod member and a second rod member pivoted to each other. The first rod member has the third end portion, the second rod member has the fourth end portion, and the third end portion is pivoted to the base.

In an embodiment of the invention, the linkage mechanism further includes a linking element. The second end portion and the fourth end portion are respectively pivoted to the linking element, and the third end portion is pivoted to the base.

In an embodiment of the invention, the linkage mechanism further includes a third linkage and a fourth linkage. The third linkage is pivoted to the first linkage. The fourth linkage is pivoted to the driving element and the third linkage.

In an embodiment of the invention, the second end portion and the fourth end portion are respectively pivoted to the driving element, and the third end portion is pivoted to the base. The linkage mechanism further includes a third linkage, a fourth linkage and a linking element. The third linkage is pivoted together with the fourth end portion to a same position of the driving element. The fourth linkage is pivoted together with the first end portion to a same position of the base. The third linkage and the fourth linkage are respectively pivoted to the linking element.

In an embodiment of the invention, the driving element includes a handle and a gear set. The handle is coupled to at least one of the second end portion and the fourth end portion through the gear set.

In an embodiment of the invention, the gear set includes a first gear, a second gear, a third gear and a fourth gear. The first gear is connected with the handle. The second gear is coupled to the first gear. The third gear is connected with the fourth end portion and coupled with the second gear. The fourth gear is connected with the second end portion and coupled with the third gear.

In an embodiment of the invention, the driving element further includes a holder, and the handle and the gear set are respectively pivoted to the holder.

A walking aid device of the invention includes a wheel set and the linkage mechanism described above, and the wheel set is pivoted to the base.

In an embodiment of the invention, the linkage mechanism further includes a riding element. The riding element is connected with the linking element, the second rod member or the third linkage in the linkage mechanism.

To sum up, a user can operate the linkage mechanism of the invention to transfer the walking aid device among use states, for example, to transfer among three states including a walking aid state, a riding state and a retracted state, and thus, the operation is easy.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
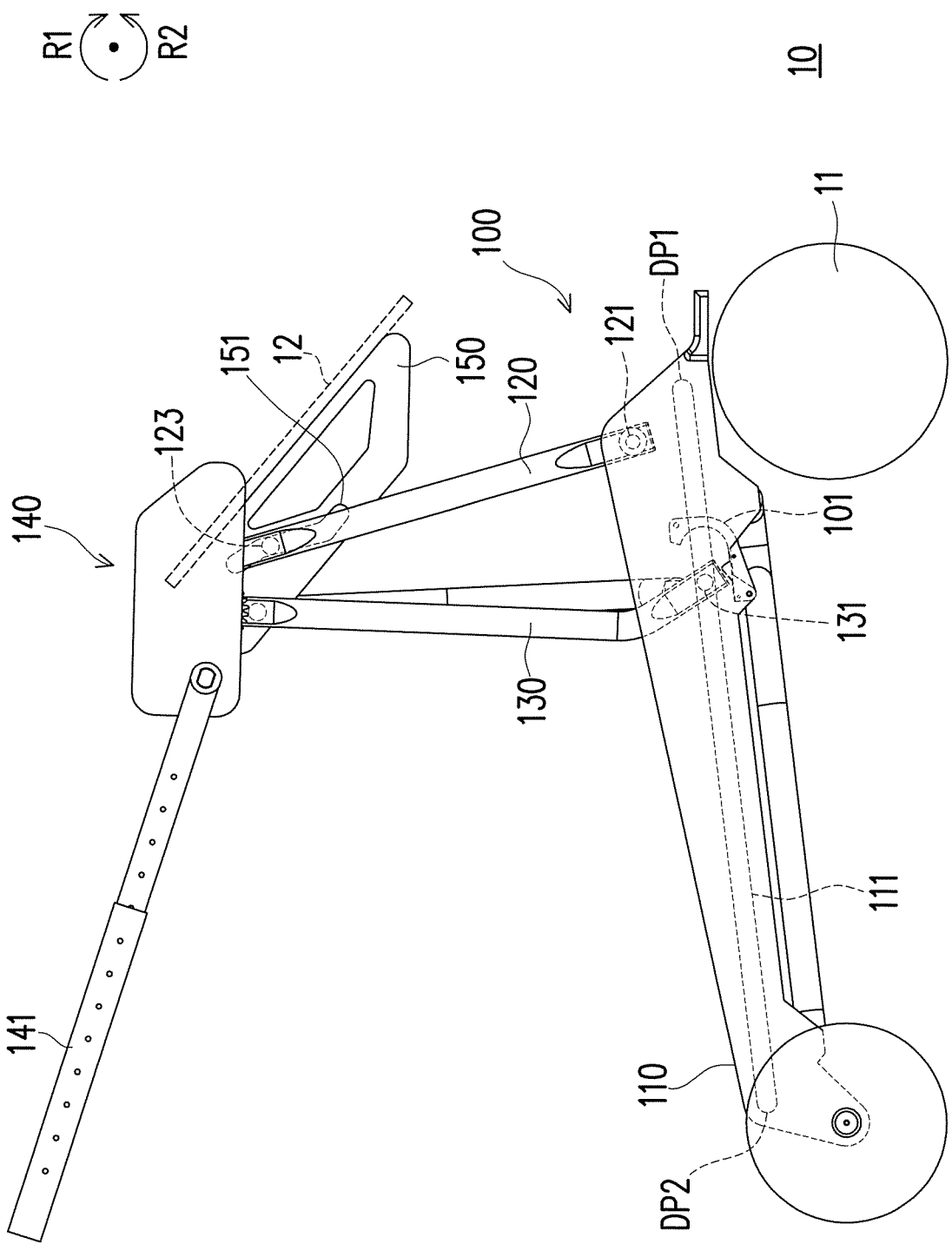
FIG. 1A is a schematic view showing a walking aid device of a first embodiment of the invention in a walking aid state.
Figure 1B:
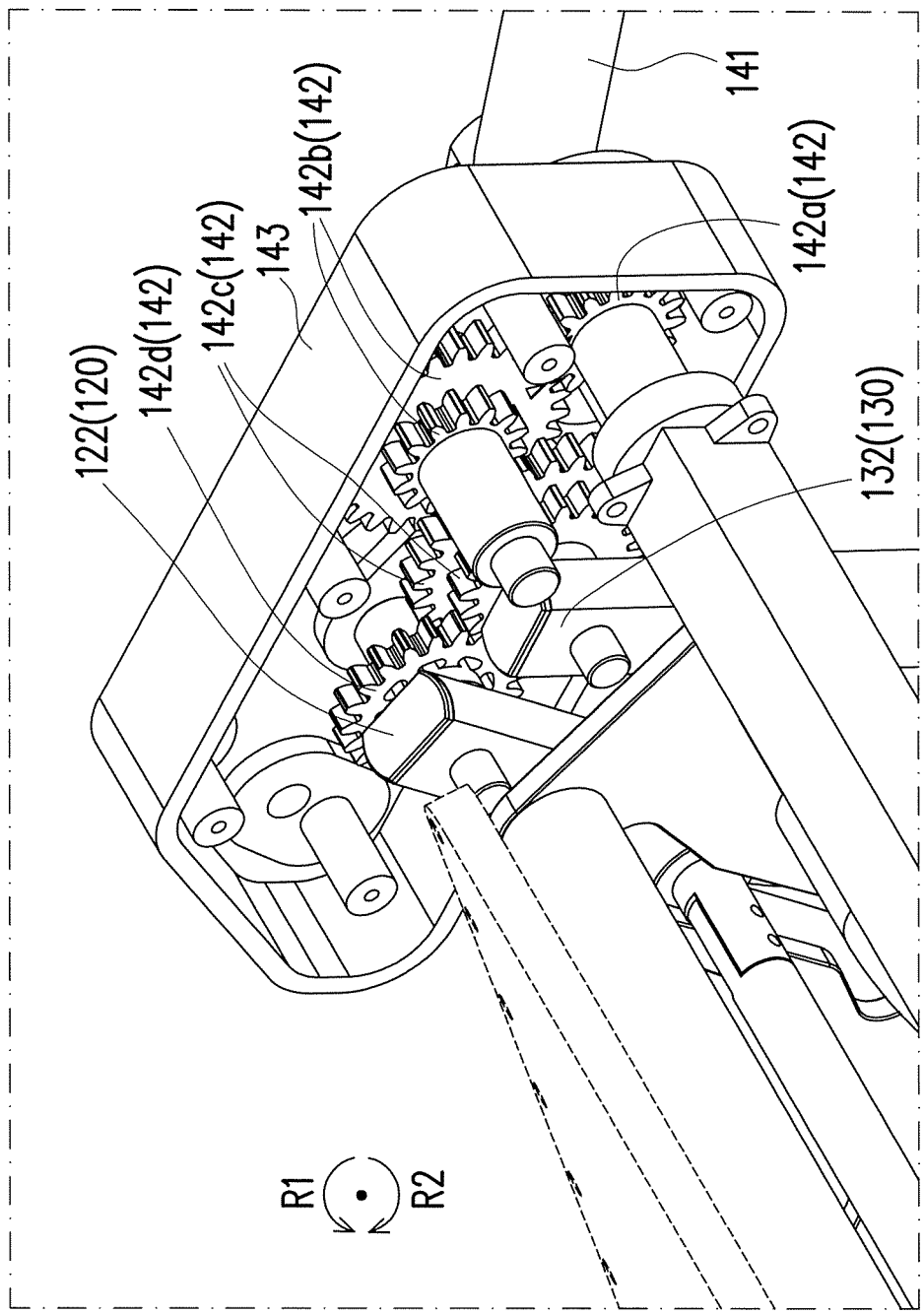
FIG. 1B is a schematic partially enlarged view of an internal structure of a gear set depicted in FIG. 1A.

FIG. 1A is a schematic view showing a walking aid device of a first embodiment of the invention in a walking aid state. FIG. 1B is a schematic partially enlarged view of an internal structure of a gear set depicted in FIG. 1A. Referring to FIG. 1A and FIG. 1B, in the present embodiment, a walking aid device 10 includes a wheel set 11 and a linkage mechanism 100. The walking aid device 10 may travel on the ground through the wheel set 11. For example, the walking aid device 10 may be pushed by a user to travel on the ground, or a motor (not shown) may be disposed on the walking aid device 10, such that the wheel set 11 may be driven by the motor (not shown) to rotate to enable the walking aid device 10 to travel on the ground. For example, the user may selectively activate the motor (not shown) to drive the wheel set 11 and may be towed by the automatically travelling walking aid device 10, such that the burden of walking may be reduced in this way.

The linkage mechanism 100 includes a base 110, a first linkage 120, a second linkage 130 and a driving element 140. The wheel set 11 is pivoted to the base 110, and the first linkage 120, the second linkage 130 and the driving element 140 are carried by the base 110. The first linkage 120 has a first end portion 121 and a second end portion 122 opposite to each other, and the first end portion 121 is pivoted to the base 110. For example, the first end portion 121 may be pivoted to the base 110 through a pivot (not shown), such that the first linkage 120 may rotate relative to the base 110 with respect to the pivot (not shown). On the other hand, the second linkage 130 has a third end portion 131 and a fourth end portion 132 opposite to each other. The third end portion 131 is coupled to the base 110, and the second end portion 122 and the fourth end portion 132 are coupled with each other.

In the present embodiment, the third end portion 131 may be a pin, and the base 110 may has a first sliding guide portion 111. The first sliding guide portion 111 may be a slide rail or a slide slot, and the third end portion 131 is slidably disposed in the first sliding guide portion 111, so as to move back and forth in the first sliding guide portion 111. Furthermore, the second linkage 130 may not only move relative to the base 110 with respect to the third end portion 131, but also rotate relative to the base 110 with respect to the third end portion 131, thereby keeping two degrees of motion freedom. The base 110 may be disposed with a stopping element 101, and the stopping element 101 is disposed corresponding to the first sliding guide portion 111 and located between two dead points DP1 and DP2 of the first sliding guide portion 111. The dead point DP1 and the dead point DP2 are opposite to each other, and the dead point DP1 is adjacent to the first end portion 121. In a walking aid state illustrated in FIG. 1A, the stopping element 101 crosses the first sliding guide portion 111, such that a path of the third end portion 131 moving toward the dead point DP1 is blocked to prevent the third end portion 131 from moving to the dead point DP1. On the other hand, the driving element 140 is coupled to the fourth end portion 132 and the second end portion 122, and when being driven by the driving element 140, the second linkage 130 may move and rotate relative to the base 110, and the first linkage 120 may rotate relative to the base 110.

Figure 1C:
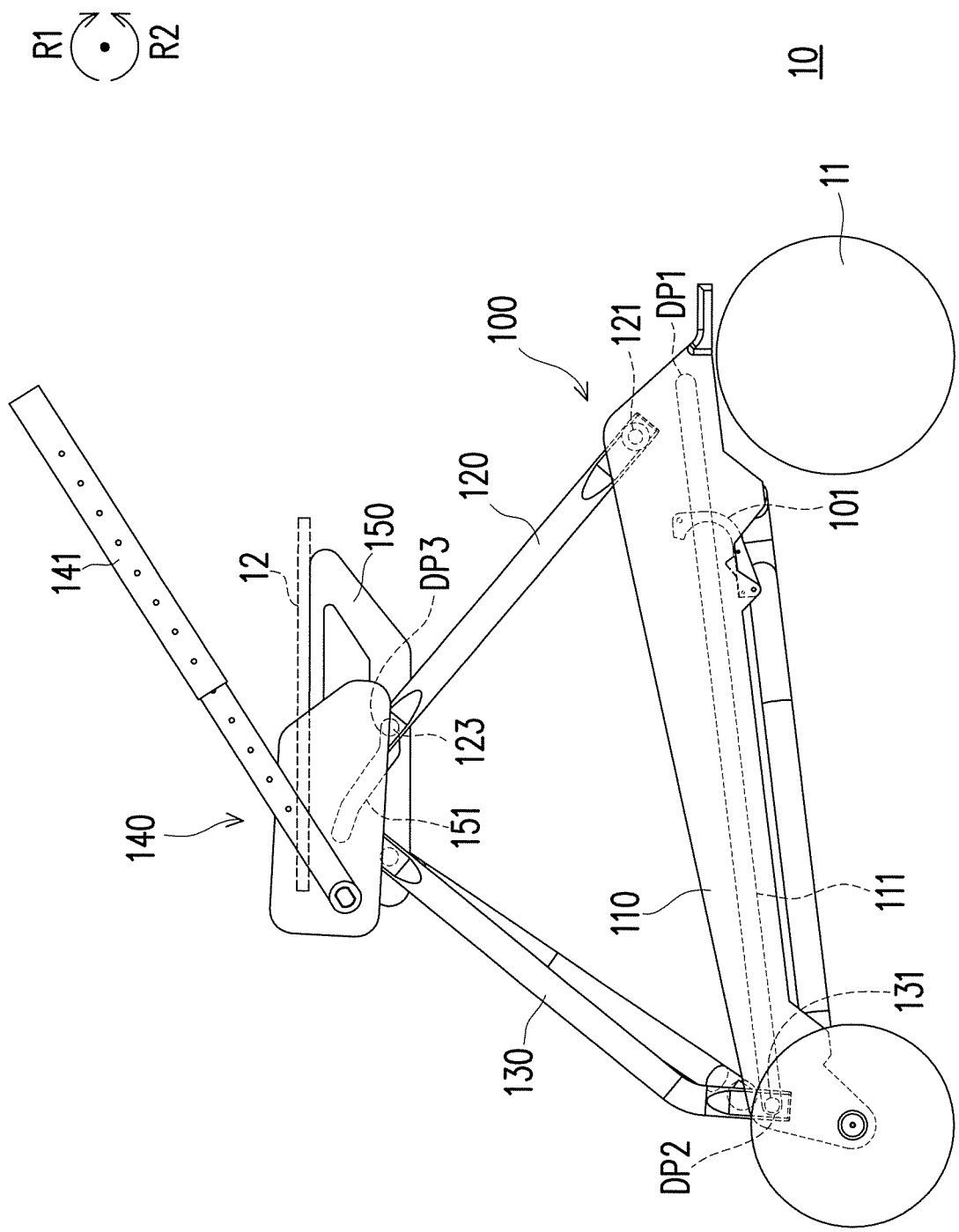
FIG. 1C is a schematic view showing that the walking aid device depicted in FIG. 1A is transferred to a riding state.
Figure 1D:
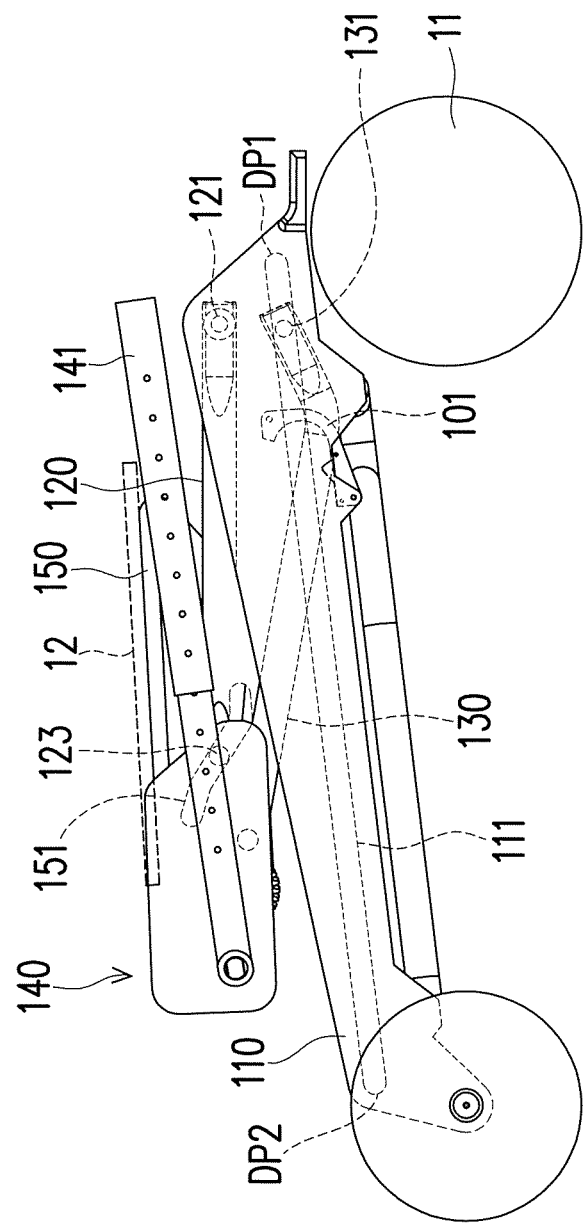
FIG. 1D is a schematic view showing that the walking aid device depicted in FIG. 1A is transferred to a retracted state.

FIG. 1C is a schematic view showing that the walking aid device depicted in FIG. 1A is transferred to a riding state. FIG. 1D is a schematic view showing that the walking aid device depicted in FIG. 1A is transferred to a retracted state. Referring to FIG. 1A to FIG. 1D, in the present embodiment, the driving element 140 includes a handle 141, a gear set 142 and a holder 143. The handle 141 and the gear set 142 are respectively pivoted to the holder 143. The handle 141 may be held by a user and is coupled to the fourth end portion 132 and the second end portion 122 through the gear set 142. To be specific, the gear set 142 may include a first gear 142*a*, a second gear 142*b*, a third gear 142*c* and a fourth gear 142*d*. An end portion of the handle 141 is pivoted to the holder 143, the first gear 142*a* is fixed to the end portion, and thereby, the first gear 142*a* may rotate with the handle 141 relative to the holder 143. The second gear 142*b* is pivoted to the holder 143, and the first gear 142*a* is coupled to the third gear 142*c* through the second gear 142*b*. With the disposition of the second gear 142b, rotation directions of the first gear 142a and the third gear 142c may be the same.

The third gear 142c is pivoted to the holder 143 and fixed to the fourth end portion 132. Thereby, the second linkage 130 may rotate with the rotation of the third gear 142c relative to the holder 143, while in the presence of a connection relation between the third end portion 131 and the first sliding guide portion 111, the second linkage 130 may move and rotate relative to the base 110 with respect to the third end portion 131. On the other hand, the fourth gear 142d is pivoted to the holder 143 and pivoted to the second end portion 121. The fourth gear 142d and the third gear 142c are coupled with each other. Namely, the fourth end portion 132 and the second end portion 122 are coupled with each other through the third gear 142c and the fourth gear 142d. When the second linkage 130 moves and rotates relative to the base 110 with respect to the third end portion 131, the first linkage 120 is driven to rotate relative to the base 110 due to a coupling relation between the fourth gear 142d and the third gear 142c.

In the present embodiment, the linkage mechanism 100 further includes a linking element 150 pivoted to second linkage 130. The linking element 150 has a second sliding guide portion 151, which is, for example, a slide rail or a slide slot. The first linkage 120 further has a coupling portion 123 located between the first end portion 121 and the second end portion 122, and the coupling portion 123 is slidably disposed in the second sliding guide portion 151. On the other hand, the linkage mechanism 100 further includes a riding element 12 connected with the linking element 150. When the first linkage 120 rotates relative to the base 110, the coupling portion 123 moves in the second sliding guide portion 151, so as to drive the linking element 150 to rotate relative to the second linkage 130, thereby changing a tilt angle between the linking element 150 and the riding element 12 thereon.

Referring to FIG. 1A and FIG. 1C, following the description set forth above, the user may push the handle 141 to rotate relative to the holder 143 along a rotation direction R1 and to drive, through the gear set 142, the second linkage 130 to move relative to the base 110 with respect to the third end portion 131 and rotate relative to the base 110 along the rotation direction R1, such that the third end portion 131 moves away from the first end portion 121 to abut against the dead point DP2 of the first sliding guide portion 111. In the meantime, the first linkage 120 is driven by the second linkage 130 to rotate relative to the base 110 along a rotation direction R2 in reverse to the rotation direction R1, and the linking element 150 is driven by the first linkage 120 to rotate relative to the second linkage 130 along the rotation direction R2, such that the coupling portion 123 slides in the second sliding guide portion 151 and then, abuts against a dead point DP3 of the second sliding guide portion 151, thereby changing the tilt angle between the linking element 150 and the riding element 12 thereon. After the walking aid device 10 is transferred from the walking aid state illustrated in FIG. 1A to a riding state illustrated in FIG. 1C, the linking element 150 and the riding element 12 thereon substantially presents horizontal, such that the user can ride on the riding element 12. As illustrated in FIG. 1C, after the second linkage 130 is expanded relative to the first linkage 120, the third end portion 131 of the second linkage 130 abuts against the dead point DP1 of the first sliding guide portion 111, and the coupling portion 123 of the first linkage 120 abuts against the dead point DP3 of the second sliding guide portion 151. Thereby, the linking element 150 and the riding element 12 thereon may be stably supported by the first linkage 120 and the second linkage 130, so as to ensure safety of the user riding on the riding element 12.

Referring to FIG. 1A and FIG. 1D, when the user wants to transfer the walking aid device 10 from the walking aid state to a retracted state, the user has to first move the first gear 142a fixed to the handle 141 to release the coupling relation between the first gear 142a and the second gear 142b, and then move the stopping element 101 away from the first sliding guide portion 111, so as to prevent the path of the third end portion 131 moving toward the dead point DP1 from being blocked by the stopping element 101. Then, the first linkage 120 and the second linkage 130 are rotated relative to the base 110 along the rotation direction R2, and the third end portion 131 of the second linkage 130 is moved adjacent to the dead point DP1 or the first end portion 121, such that the first linkage 120, the second linkage 130, the linking element 150 and the riding element 12 may move as close as possible to the base 110 to superpose on the base 110. Lastly, the user may rotate the handle 141 to get the handle 141 as close as possible to the base 110, such that a volume of the walking aid device 10 in the retracted state becomes much smaller than that of the walking aid device 10 in the walking aid state of the riding state, which is convenient for the user to carry.

Other embodiments will be provided below for description. It has to be mentioned that element labels and portions of the previous embodiments are referenced in the embodiments which will be described below, and the same or similar elements are indicated by the same or similar reference labels. The descriptions of the same technical details are therefore omitted. The parts omitted from description may be referenced from the afore-described embodiments and are not repeated in the embodiments below.

Figure 2A:
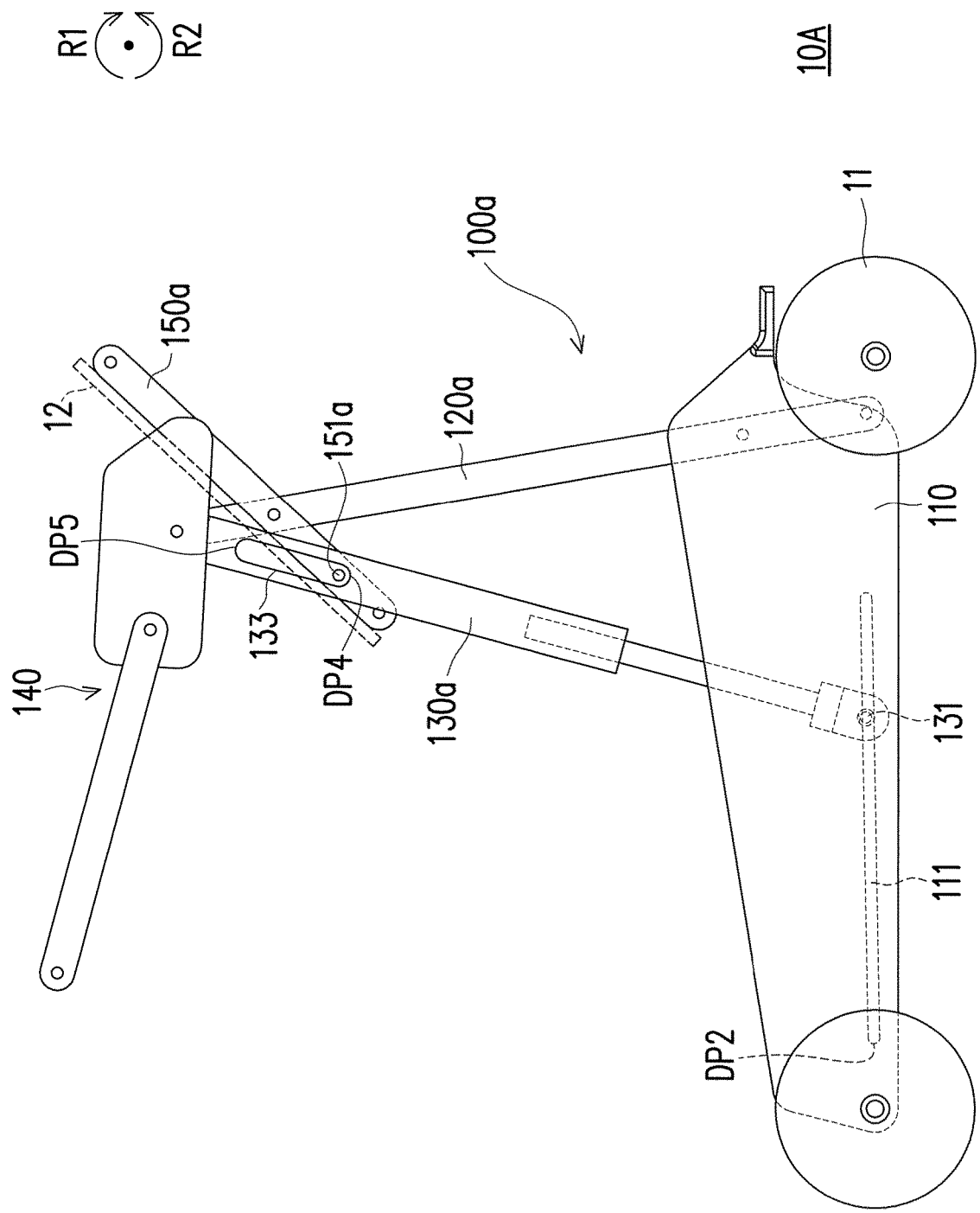
FIG. 2A is a schematic view showing a walking aid device of a second embodiment of the invention in the walking aid state.
Figure 2B:
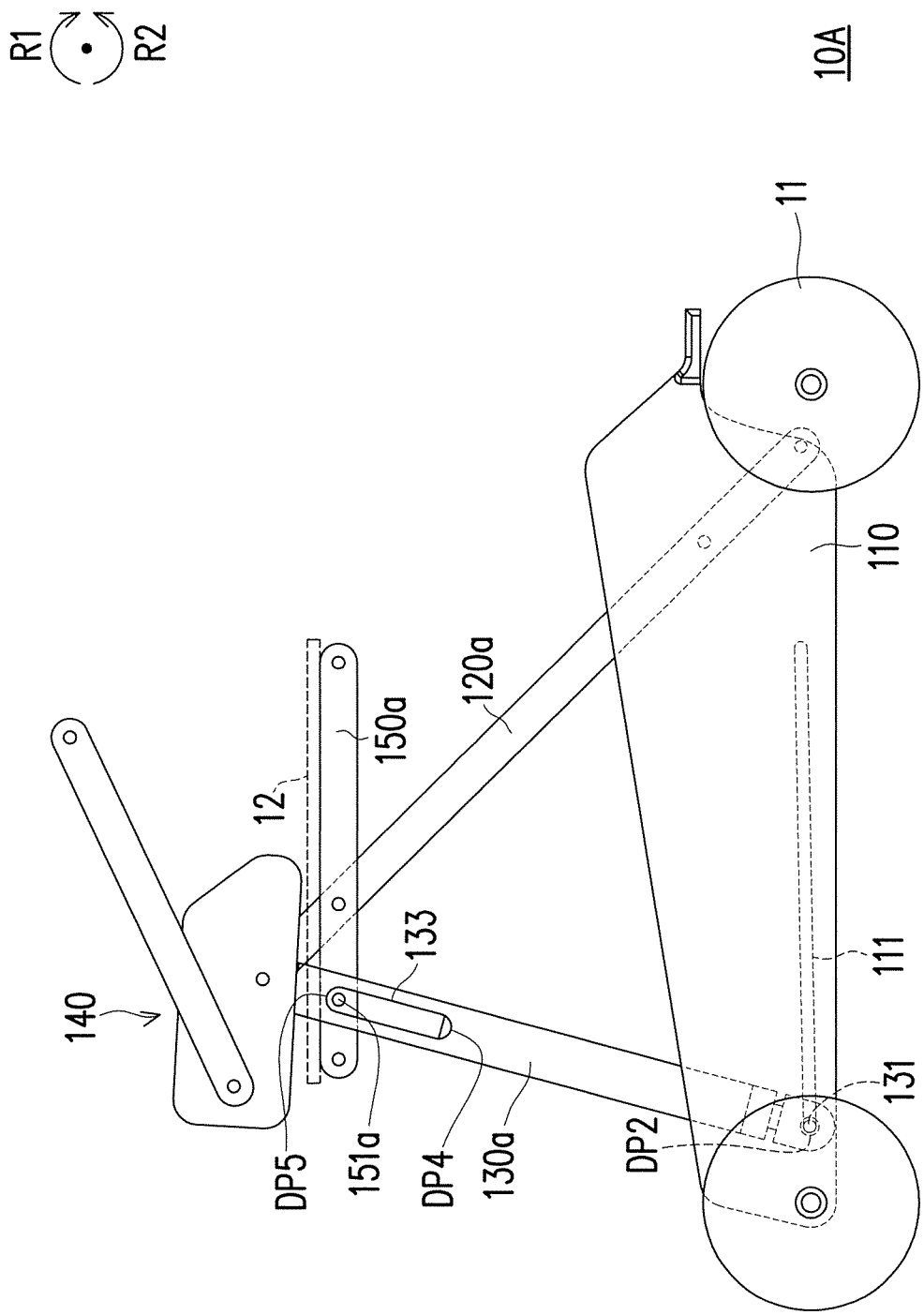
FIG. 2B is a schematic view showing that the walking aid device depicted in FIG. 2A is transferred to the riding state.

FIG. 2A is a schematic view showing a walking aid device of a second embodiment of the invention in the walking aid state. FIG. 2B is a schematic view showing that the walking aid device depicted in FIG. 2A is transferred to the riding state. Referring to FIG. 2A and FIG. 2B, the main difference between a linkage mechanism 100a of a walking aid device 10A of the present embodiment and the linkage mechanism 100 of the walking aid device 10 of the first embodiment lies in the connection relation between the first linkage as well as the second linkage and the linking element, the structure type of the second linkage and the structure type of the linking element. To be specific, in the present embodiment, the linking element 150a is pivoted to a first linkage 120a, wherein a second linkage 130a is a retractable rod and has a second sliding guide portion 133, which is, for example, a slide rail or a slide slot. The linking element 150a has a coupling portion 151a, which is, for example, a pin and is slidably disposed in the second sliding guide portion 133.

When the walking aid device 10A is transferred from the walking aid state illustrated in FIG. 2A to the riding state illustrated in FIG. 2B, the second linkage 130a driven by the driving element 140 moves relative to the base 110 with respect to the third end portion 131 and rotates relative to the base 110 along the rotation direction R1 and thereby is compressed. In the meantime, the first linkage 120a is driven by the second linkage 130a to rotate relative to the base 110 along the rotation direction R2, and the coupling portion 151a moves from a dead point DP4 to a dead point DP5 of the second sliding guide portion 133, such that the linking element 150a rotates relative to the first linkage 120a along the rotation direction R1, thereby changing a tilt angle between the linking element 150a and the riding element 12 thereon. After the walking aid device 10A is transferred from the walking aid state illustrated in FIG. 2A to the riding state illustrated in FIG. 2B, the linking element 150a and the riding element 12 thereon substantially present horizontal. As illustrated in FIG. 2B, after the second linkage 130a is expanded relative to the first linkage 120a, the third end portion 131 of the second linkage 130a abuts against the dead point DP2 of the first sliding guide portion 111, and the coupling portion 151a of the linking element 150a abuts against the dead point DP5 of the second sliding guide portion 133. Thereby, the linking element 150a and the riding element 12 thereon may be stably supported by the first linkage 120a and the second linkage 130a, so as to ensure safety of the user riding on the riding element 12.

Figure 3A:
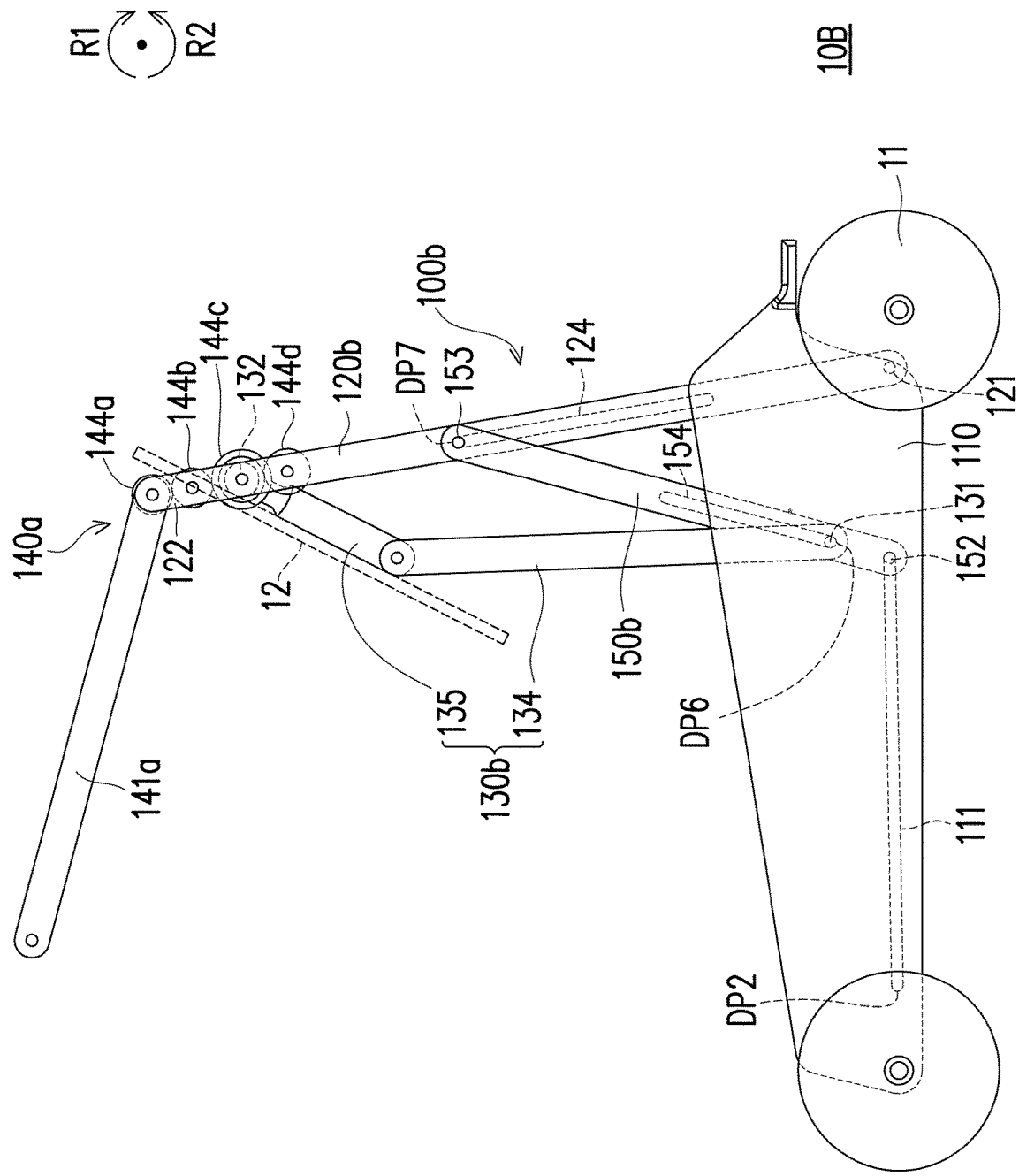
FIG. 3A is a schematic view showing a walking aid device of a third embodiment of the invention in the walking aid state.
Figure 3B:
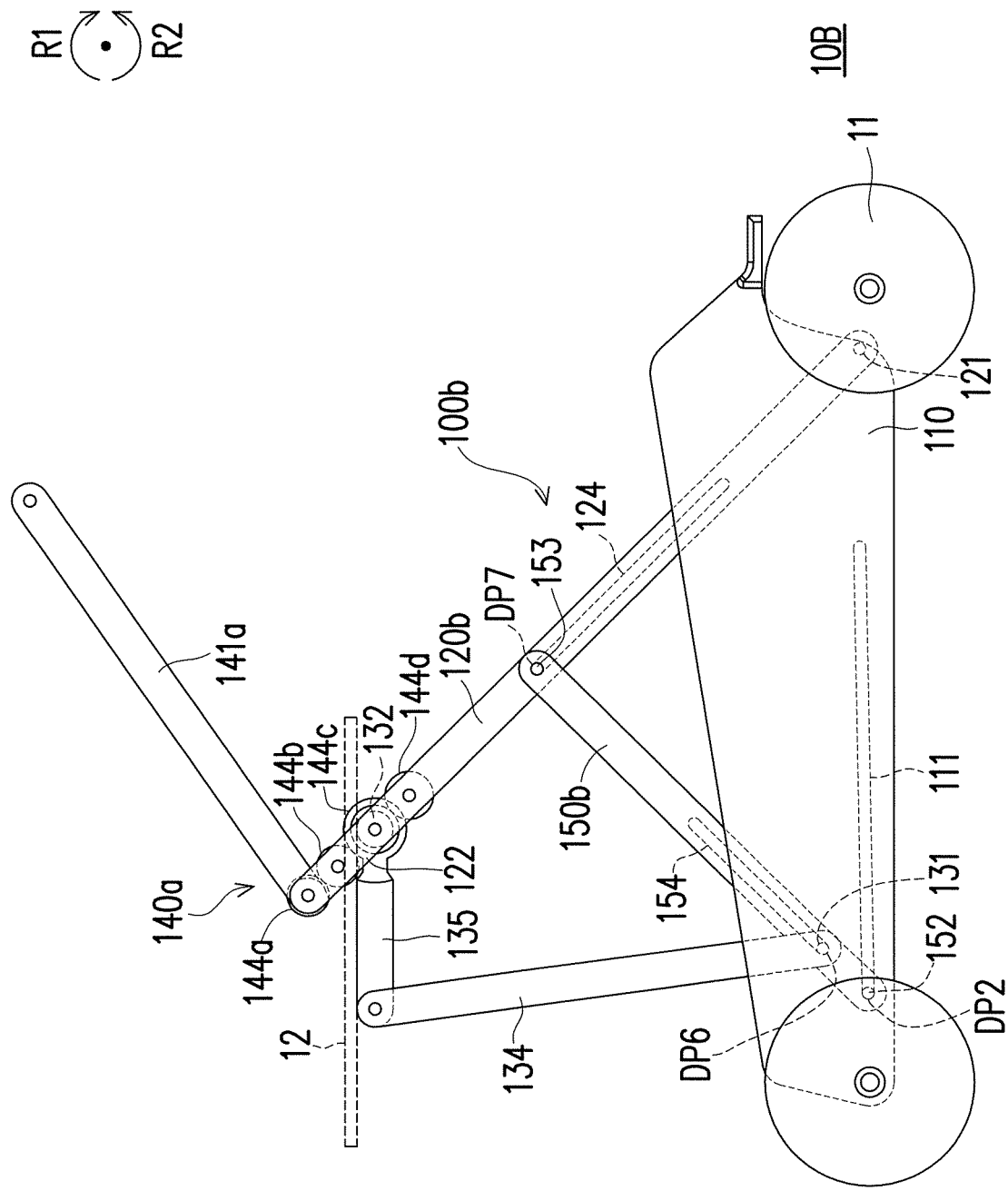
FIG. 3B is a schematic view showing that the walking aid device depicted in FIG. 3A is transferred to the riding state.

FIG. 3A is a schematic view showing a walking aid device of a third embodiment of the invention in the walking aid state. FIG. 3B is a schematic view showing that the walking aid device depicted in FIG. 3A is transferred to the riding state. Referring to FIG. 3A and FIG. 3B, the main difference between a linkage mechanism 100b of a walking aid device 10B of the present embodiment and the linkage mechanism 100 of the walking aid device 10 of the first embodiment lies in the connection relation between the first linkage as well as the second linkage and the linking element, the structure type of the first linkage, the structure type of the second linkage, the structure type of the linking element and the disposition of the riding element. To be specific, in the present embodiment, a second linkage 130b has a first rod member 134 and a second rod member 135 pivoted to each other; wherein the first rod member 134 has the third end portion 131, and the second rod member 135 has the fourth end portion 132. The third end portion 131 is coupled to a linking element 150b and coupled to the base 110 through the linking element 150b. On the other hand, the riding element 12 is connected with the second rod member 135.

The linking element 150b has a first coupling portion 152, a second coupling portion 153 and a second sliding guide portion 154 located between the first coupling portion 152 and the second coupling portion 153, and a first linkage 120b further has a third sliding guide portion 124 located between the first end portion 121 and the second end portion 122. The first coupling portion 152 is slidably disposed in the first sliding guide portion 111, the second coupling portion 153 is slidably disposed in the third sliding guide portion 124, and the third end portion 131 of the first rod member 134 is slidably disposed in the second sliding guide portion 154. Therein, the second sliding guide portion 154 and the third sliding guide portion 124 may be slide rails or slide slots.

When the walking aid device 10B is transferred from the walking aid state illustrated in FIG. 3A to the riding state illustrated in FIG. 3B, the second rod member 135 driven by the driving element 140a rotates along the rotation direction R1, thereby changing a tilt angle between the second rod member 135 and the riding element 12 thereon, and the first rod member 134, the linking element 150b and the first linkage 120b are driven by the second rod member 135 to move. In this circumstance, a location of the third end portion 131 of the first rod member 134 in the second sliding guide portion 154 is fixed, and a location of the second coupling portion 153 of the linking element 150b in the third sliding guide portion 124 is fixed, but the second rod member 135 rotates along the rotation direction R1, while the first linkage 120b rotates relative to the base 110 along the rotation direction R2, such that the linking element 150b moves relative to the base 110 with respect to the first coupling portion 152 and rotates relative to the base 110 along the rotation direction R1.

Furthermore, the driving element 140a includes a handle 141a, a first gear 144a, a second gear 144b, a third gear 144c and a fourth gear 144d. The first gear 144a is fixed to an end portion of the handle 141a, and the handle 141a is pivoted to the first linkage 120b through the first gear 144a. The second gear 144b, the third gear 144c and the fourth gear 144d are respectively pivoted to the first linkage 120b, and the third gear 144c is fixed to the fourth end portion 132 of the second rod member 135. When the handle 141a rotates relative to the first linkage 120b along the rotation direction R1, the first gear 144a drives the second gear 144b to rotate relative to the first linkage 120b along the rotation direction R2, and the third gear 144c is driven by the second gear 144b to rotate relative to the first linkage 120b along the rotation direction R1, such that the second rod member 135 rotates relative to the first linkage 120b along the rotation direction R1.

After the walking aid device 10B is transferred from the walking aid state illustrated in FIG. 3A to the riding state illustrated in FIG. 3B, the second rod member 135 and the riding element 12 thereon substantially present horizontal. As illustrated in FIG. 3B, after the second linkage 130b and the linking element 150b are expanded relative to the first linkage 120b, the first coupling portion 152 of the linking element 150b abuts against the dead point DP2 of the first sliding guide portion 111, the third end portion 131 abuts against a dead point DP6 of the second sliding guide portion 154, and the second coupling portion 153 abuts against a dead point DP7 of the third sliding guide portion 124. Thereby, the second rod member 135 and the riding element 12 thereon may be stably supported by the first linkage 120b, the first rod member 134 and the linking element 150b, so as to ensure safety of the user riding on the riding element 12.

Figure 4A:
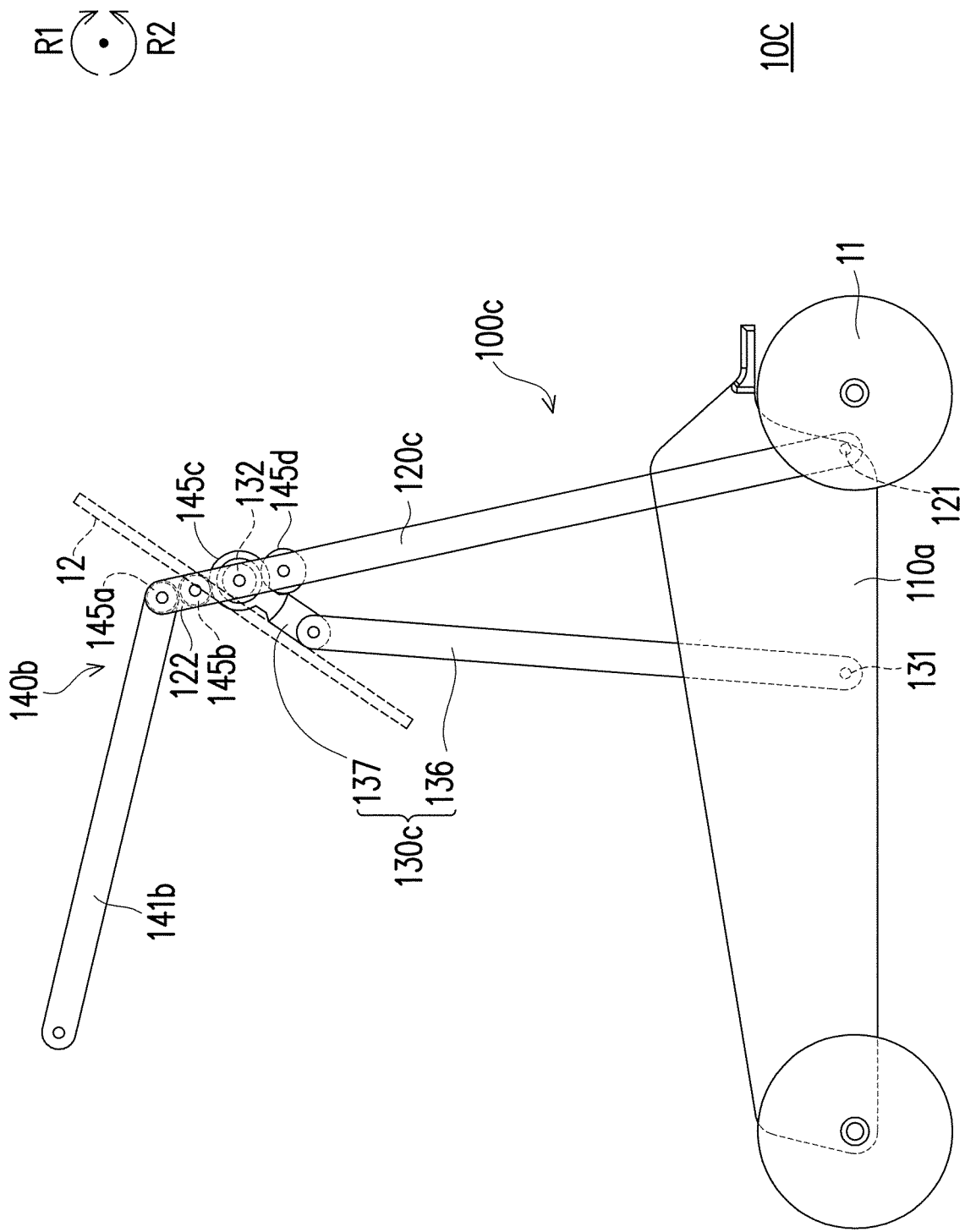
FIG. 4A is a schematic view showing a walking aid device of a fourth embodiment of the invention in the walking aid state.
Figure 4B:
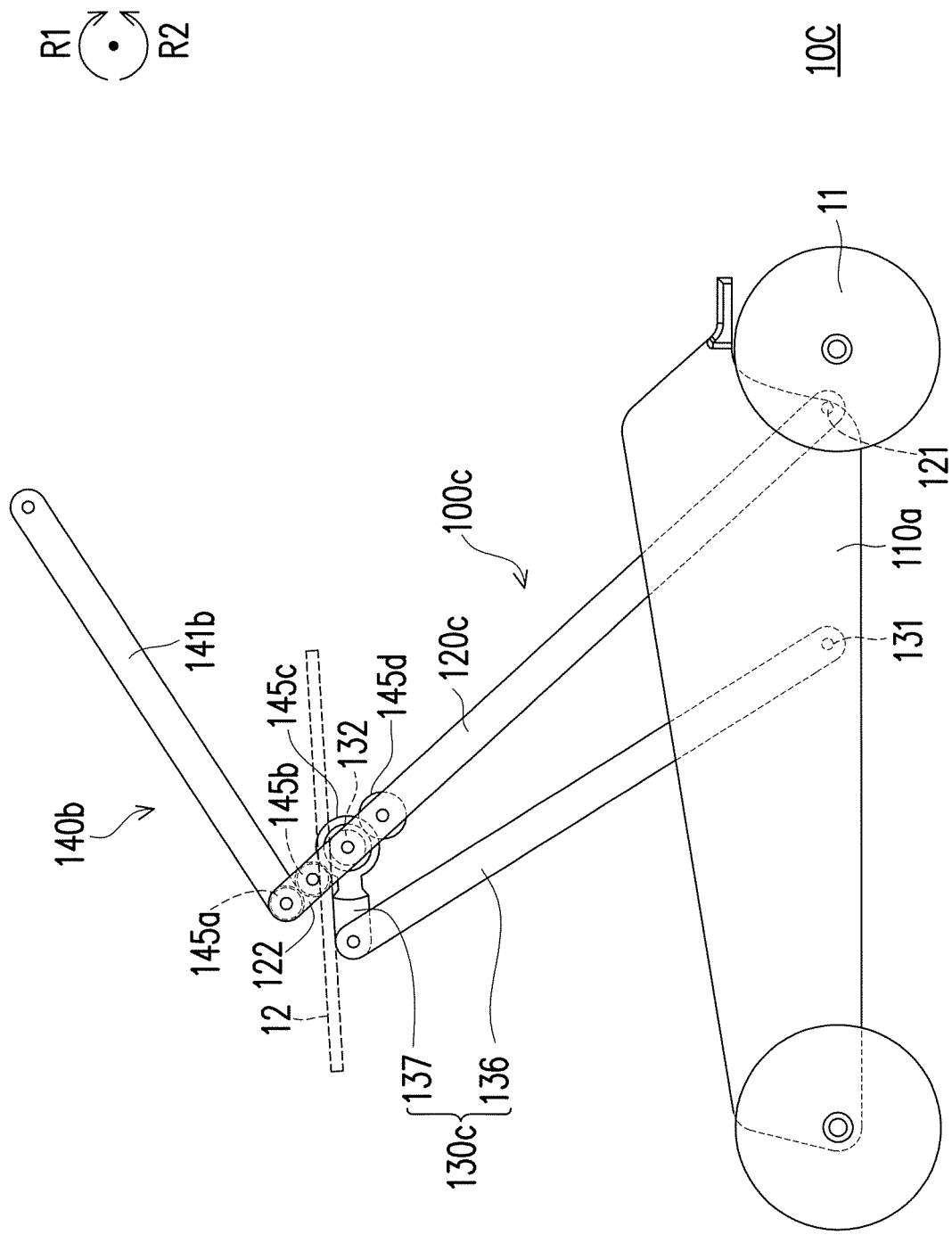
FIG. 4B is a schematic view showing that the walking aid device depicted in FIG. 4A is transferred to the riding state.

FIG. 4A is a schematic view showing a walking aid device of a fourth embodiment of the invention in a walking aid state. FIG. 4B is a schematic view showing that the walking aid device depicted in FIG. 4A is transferred to a riding state. Referring to FIG. 4A and FIG. 4B, the main difference between a linkage mechanism 100c of a walking aid device 10C of the present embodiment and the linkage mechanism 100 of the walking aid device 10 of the first embodiment lies in the connection relation between the second linkage and the base, the structure type of the base, the structure type of the second linkage and the disposition of the riding element. To be specific, in the present embodiment, the walking aid device 10C is not disposed with any linking element, and a base 110a is not disposed with any sliding guide portion. A second linkage 130c is pivoted to the base 110a and thus, has no degree of freedom for moving relative to the base 110a. The second linkage 130c has a first rod member 136 and a second rod member 137 pivoted to each other. The first rod member 136 has the third end portion 131, the second rod member 137 has the fourth end portion 132, and the third end portion 131 is pivoted to the base 110a. On the other hand, the riding element 12 is connected with the second rod member 137.

When the walking aid device 10C is transferred from the walking aid state illustrated in FIG. 4A to the riding state illustrated in FIG. 4B, the second rod member 137 driven by a driving element 140b rotates along the rotation direction R1, thereby changing a tilt angle between the second rod member 137 and the riding element 12 thereon, and the first rod member 136 and a first linkage 120c are driven by the second rod member 137 to rotate relative to the base 110a along the rotation direction R2. After the walking aid device 10C is transferred from the walking aid state illustrated in FIG. 4A to the riding state illustrated in FIG. 4B, the second rod member 137 and the riding element 12 thereon substantially present horizontal.

Furthermore, the driving element 140b includes a handle 141b, a first gear 145a, a second gear 145b, a third gear 145c and a fourth gear 145d. The first gear 145a is fixed to an end portion of the handle 141b, and the handle 141b is pivoted to the first linkage 120c through the first gear 145a. The second gear 145b, the third gear 145c and the fourth gear 145d are respectively pivoted to the first linkage 120c, and the third gear 145c is fixed to the fourth end portion 132 of the second rod member 137. When the handle 141b rotates relative to the first linkage 120b along the rotation direction R1, the first gear 145a drives the second gear 145b to rotate relative to the first linkage 120b along the rotation direction R2, the third gear 145c is driven by the second gear 145b to rotate relative to the first linkage 120b along the rotation direction R1, such that the second rod member 137 rotates relative to the first linkage 120b along the rotation direction R1.

Figure 5A:
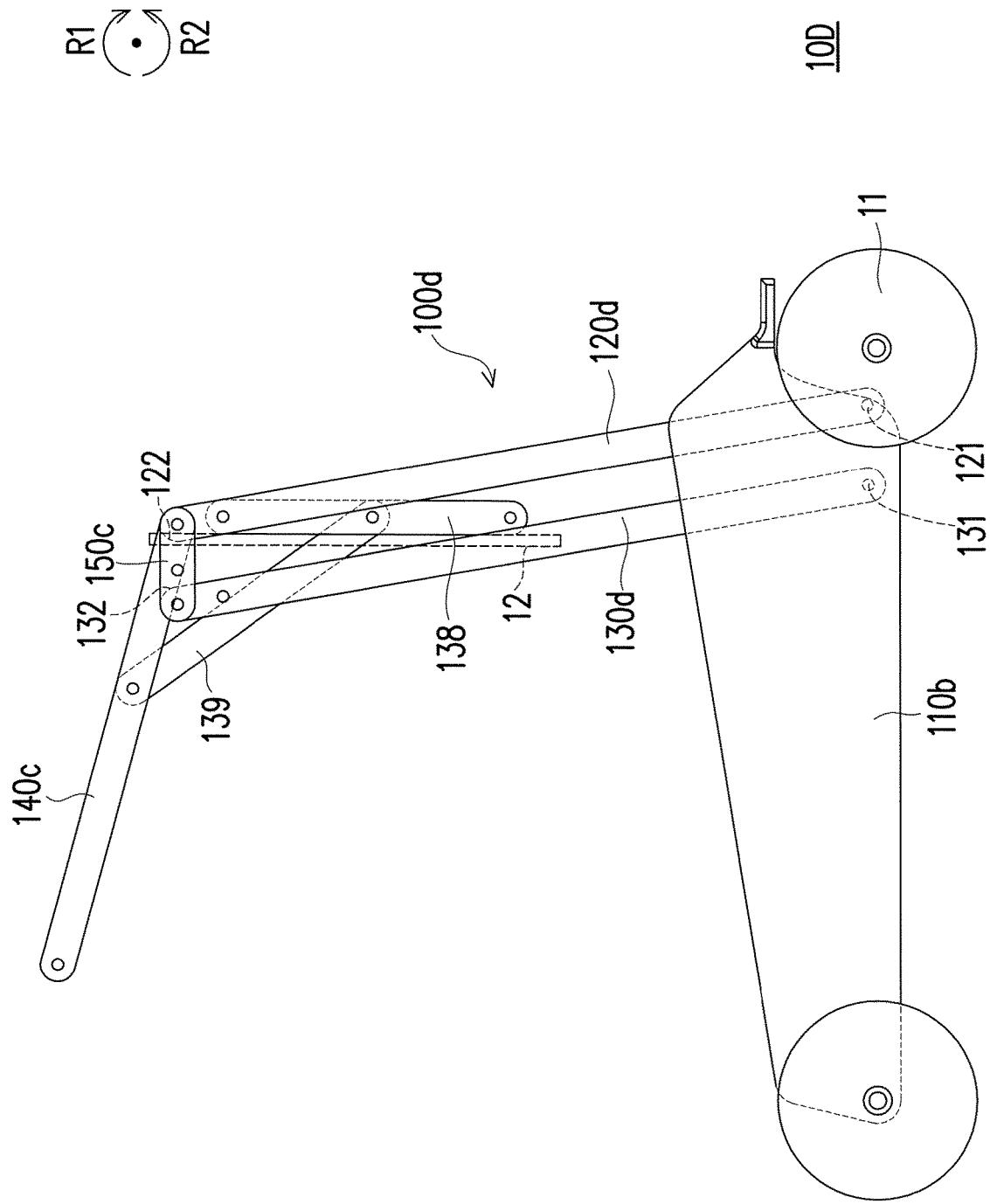
FIG. 5A is a schematic view showing a walking aid device of a fifth embodiment of the invention in the walking aid state.
Figure 5B:
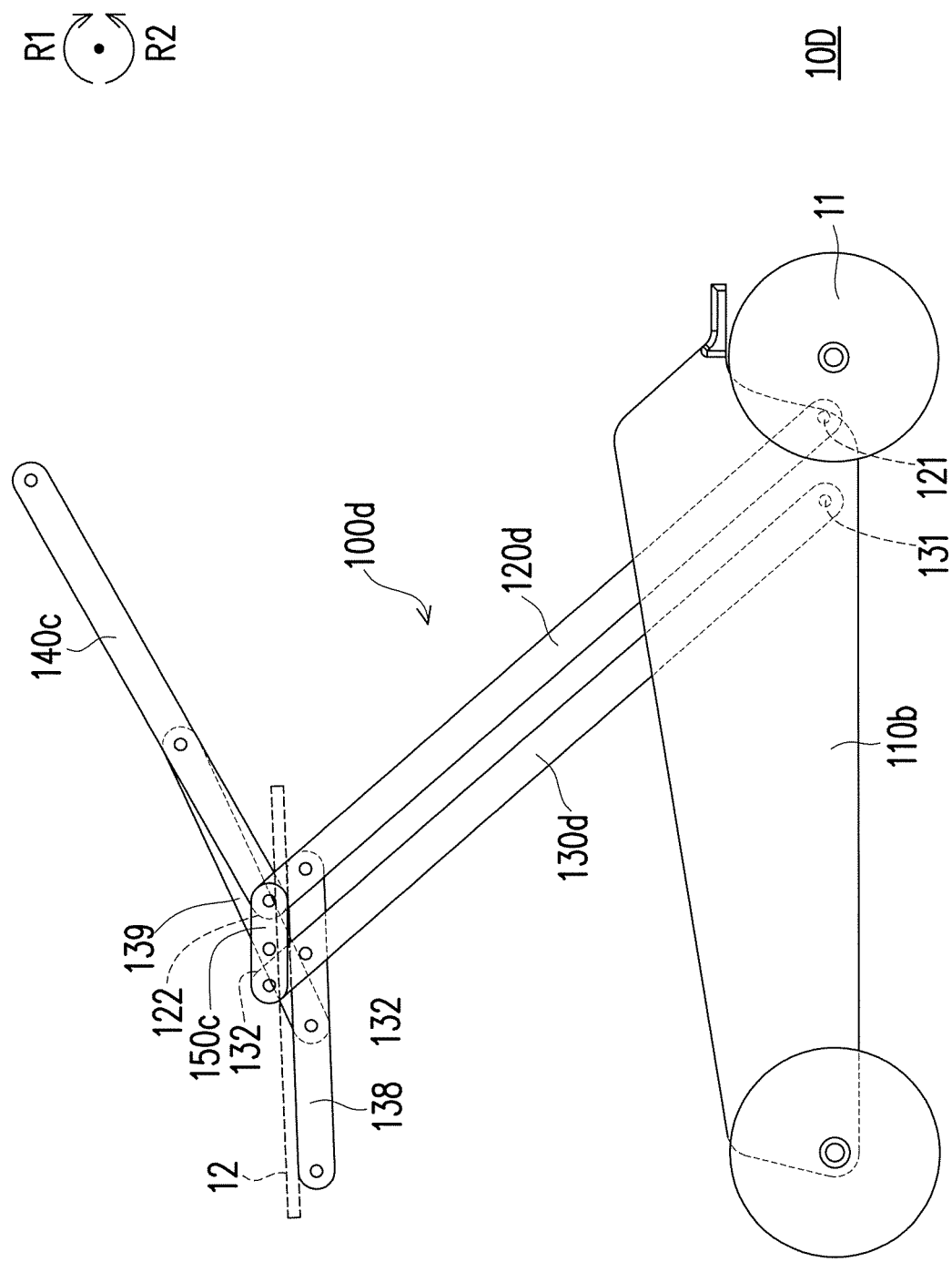
FIG. 5B is a schematic view showing that the walking aid device depicted in FIG. 5A is transferred to the riding state.

FIG. 5A is a schematic view showing a walking aid device of a fifth embodiment of the invention in the walking aid state. FIG. 5B is a schematic view showing that the walking aid device depicted in FIG. 5A is transferred to the riding state. Referring to FIG. 5A and FIG. 5B, the main difference between a linkage mechanism 100d of a walking aid device 10D of the present embodiment and the linkage mechanism 100 of the walking aid device 10 of the first embodiment lies in the connection relation between the first linkage as well as the second linkage and the linking element, the connection relation between the second linkage and the base, the structure type of the base and the disposition of the riding element. To be specific, in the present embodiment, the walking aid device 10D is not disposed with any gear set, and a base 110b is not disposed with sliding guide portion. A second linkage 130d is pivoted to the base 110b and thus, has no degree of freedom for moving relative to the base 110b.

The second end portion 122 of a first linkage 120d and the fourth end portion 132 of a second linkage 130d are respectively pivoted to a linking element 150c, the first end portion 121 of the first linkage 120d and the third end portion 131 of the second linkage 130d are respectively pivoted to the base 110b, and thus, the first linkage 120d and the second linkage 130d may keep parallel to each other in either a static state or during a motion process. The linkage mechanism 100d further includes a third linkage 138 and a fourth linkage 139. The third linkage 138 is pivoted to the first linkage 120d, and the fourth linkage 139 is pivoted to a driving element 140c and the third linkage 138. In the present embodiment, the driving element 140c may be a handle, and the first linkage 120d and the fourth linkage 139 may be respectively pivoted to the driving element 140c. On the other hand, the riding element 12 is connected with the third linkage 138.

When the driving element 140c rotates relative to the first linkage 120d along the rotation direction R1, the third linkage 138 and the fourth linkage 139 are driven by the driving element 140c to rotate relative to the first linkage 120d along the rotation direction R1, thereby changing a tilt angle between the third linkage 138 and the riding element 12 thereon. In the meantime, the linking element 150c, the first linkage 120d and the second linkage 130d which are pivoted to one another are driven by the third linkage 138 to rotate relative to the base 110b along the rotation direction R2, such that the walking aid device 10D is transferred from the walking aid state illustrated in FIG. 5A to the riding state illustrated in FIG. 5B, and the third linkage 138 and the riding element 12 thereon substantially present horizontal.

Figure 6A:
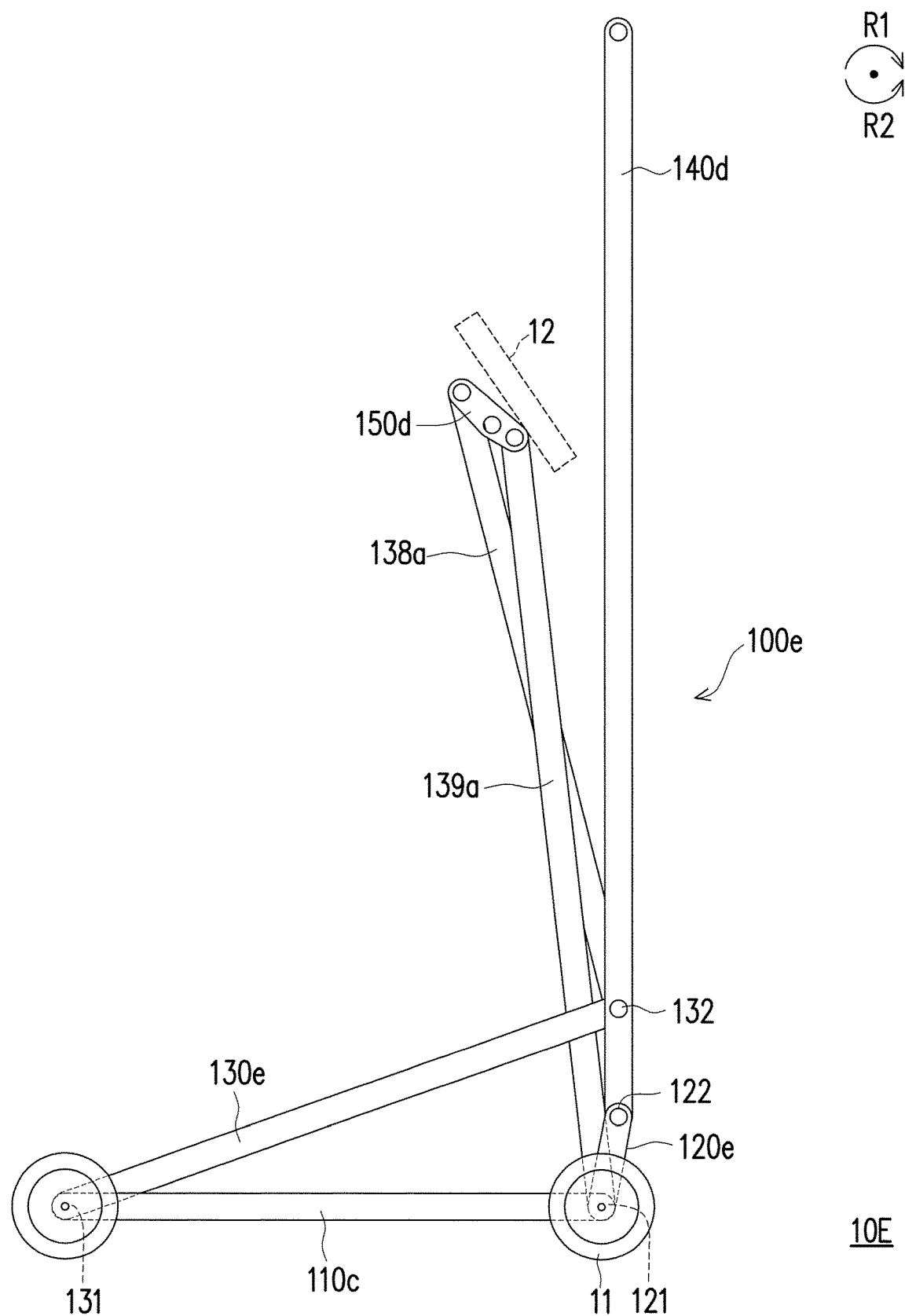
FIG. 6A is a schematic view showing a walking aid device of a sixth embodiment of the invention in the walking aid state.
Figure 6B:
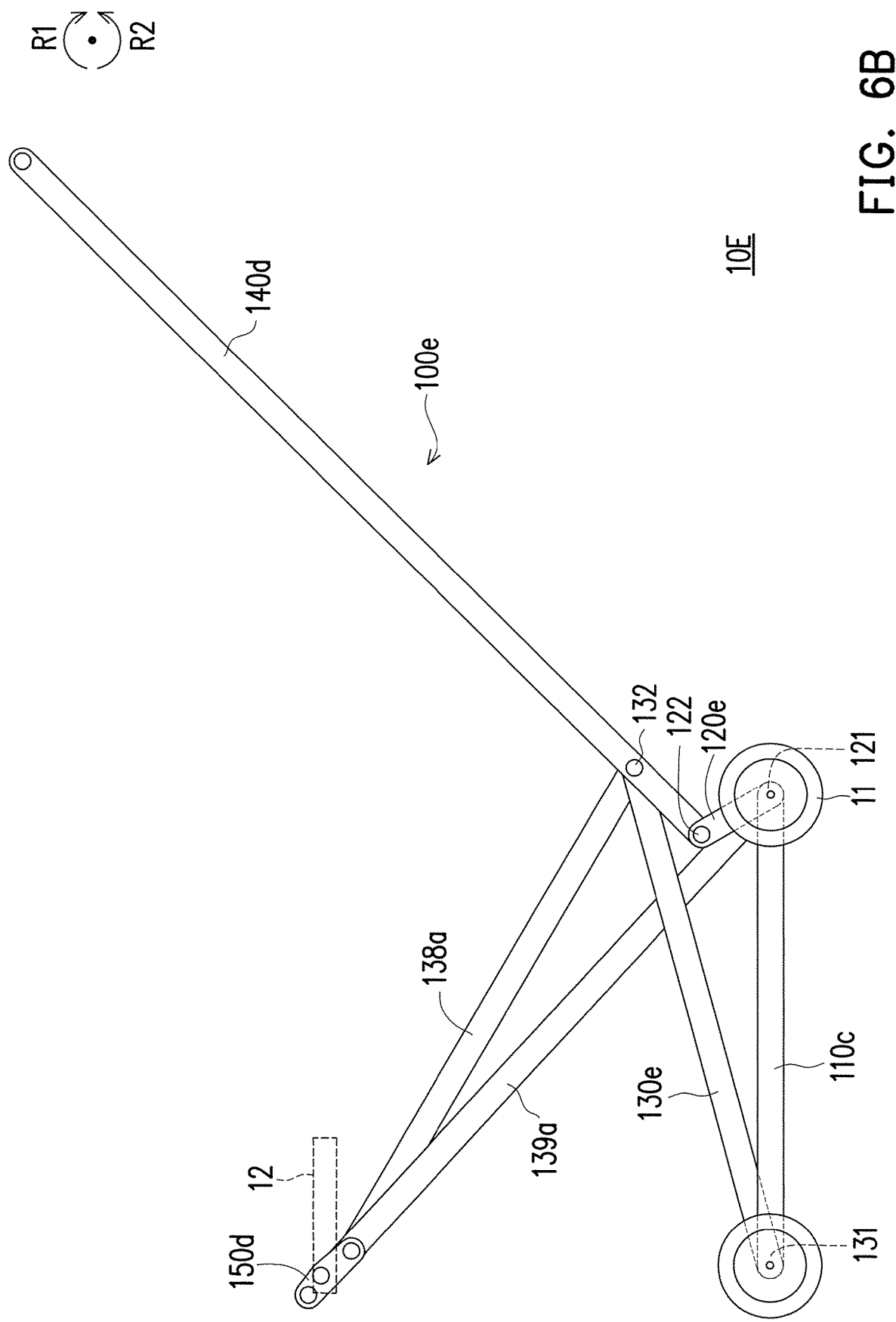
FIG. 6B is a schematic view showing that the walking aid device depicted in FIG. 6A is transferred to the riding state.

FIG. 6A is a schematic view showing a walking aid device of a sixth embodiment of the invention in the walking aid state. FIG. 6B is a schematic view showing that the walking aid device depicted in FIG. 6A is transferred to the riding state. Referring to FIG. 6A and FIG. 6B, the main difference between a linkage mechanism 100e of a walking aid device 10E of the present embodiment and the linkage mechanism 100 of the walking aid device 10 of the first embodiment lies in the connection relation between the first linkage as well as the second linkage and the driving element, the connection relation between the second linkage and the base, the structure type of the base and the disposition of the riding element. To be specific, in the present embodiment, the walking aid device 10E is not disposed with any gear set, and a base 110c is not disposed with any sliding guide portion. The third end portion 131 of a second linkage 130e is pivoted to the base 110c and thus, has no degree of freedom for moving relative to the base 110c.

In the present embodiment, a driving element 140d may be a handle, and the second end portion 122 of a first linkage 120e and the fourth end portion 132 of a second linkage 130e are respectively pivoted to a driving element 140d. The linkage mechanism 100e further includes a third linkage 138a and a fourth linkage 139a. An end portion of the third linkage 138a is pivoted with the fourth end portion 132 to a same position of the driving element 140d, and an end portion of the fourth linkage 139a is pivoted with the first end portion 121 to a same position of the base 110c. On the other hand, another end portion of the third linkage 138a and another end portion of the fourth linkage 139a are respectively pivoted to a linking element 150d, and the riding element 12 is connected with the linking element 150d. In part of the embodiments, the first linkage 120e and the fourth linkage 139a may be an integrally formed rod member.

The driving element 140d, when rotating relative to the first linkage 120e along the rotation direction R1, drives the first linkage 120e and the fourth linkage 139a to rotate relative to the base 110c along the rotation direction R2 and drives the third linkage 138a to rotate relative to the driving element 140d along the rotation direction R2. In the meantime, the linking element 150d also rotates with the third linkage 138a and the fourth linkage 139a along the rotation direction R2, thereby changing a tilt angle between the linking element 150d and the riding element 12 thereon, such that the walking aid device 10E is transferred from the walking aid state illustrated in FIG. 6A to the riding state illustrated in FIG. 6B, and the linking element 150d and the riding element 12 thereon substantially present horizontal.

In light of the foregoing, the user can operate the linkage mechanism of the invention to transfer the walking aid device among the use states, for example, to transfer among three states including the walking aid state, the riding state and the retracted state. Namely, the walking aid device of the invention can be not only easily operated, but also provided with functions, such as aiding the user to walk and allowing the user to ride thereon for travelling. On the other hand, in comparison with the walking aid device in the walking aid state or the riding state, the volume of the walking aid device in the retracted state can be significantly reduced, which is convenient for the user to carry.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A linkage mechanism, comprising:
a base;
a first linkage, having a first end portion and a second end portion opposite to each other, and the first end portion being pivoted to the base;
a second linkage, having a third end portion and a fourth end portion opposite to each other, wherein the third end portion is coupled to the base, and the second end portion and the fourth end portion are coupled with each other; and
a driving element, rotatably coupled to at least one of the second end portion and the fourth end portion, and the driving element being configured to rotatably drive both of the first linkage and the second linkage to rotate relative to the base.

2. The linkage mechanism as recited in claim 1, wherein the base has a first sliding guide portion, and the third end portion of the second linkage is slidably disposed in the first sliding guide portion.

3. The linkage mechanism as recited in claim 2, further comprising:
a linking element, pivoted to the second linkage, wherein the linking element has a second sliding guide portion, the first linkage further has a coupling portion located between the first end portion and the second end portion, and the coupling portion is slidably disposed in the second sliding guide portion.

4. The linkage mechanism as recited in claim 3, wherein the coupling portion is configured to move in the second sliding guide portion when the first linkage rotates relative to the base, so as to drive the linking element to rotate relative to the second linkage, thereby changing a tilt angle between the linking element and a riding element thereon.

5. The linkage mechanism as recited in claim 2, further comprising:
a linking element, pivoted to the first linkage, wherein the second linkage is a retractable rod and has a second sliding guide portion, the linking element has a coupling portion, and the coupling portion is slidably disposed in the second sliding guide portion.

6. The linkage mechanism as recited in claim 1, wherein the second linkage has a first rod member and a second rod member pivoted to each other, the first rod member has the third end portion, the second rod member has the fourth end portion, the linkage mechanism further comprises a linking element, and the third end portion is coupled to the linking element and coupled to the base through the linking element.

7. The linkage mechanism as recited in claim 6, wherein the base has a first sliding guide portion, the linking element has a first coupling portion, a second coupling portion and a second sliding guide portion located between the first coupling portion and the second coupling portion, the first linkage further has a third sliding guide portion located between the first end portion and the second end portion, the first coupling portion is slidably disposed in the first sliding guide portion, the second coupling portion is slidably disposed in the third sliding guide portion, and the third end portion is slidably disposed in the second sliding guide portion.

8. The linkage mechanism as recited in claim 1, wherein the second linkage has a first rod member and a second rod member pivoted to each other, the first rod member has the third end portion, the second rod member has the fourth end portion, and the third end portion is pivoted to the base.

9. The linkage mechanism as recited in claim 1, further comprising:
a linking element, wherein the second end portion and the fourth end portion are respectively pivoted to the linking element, and the third end portion is pivoted to the base.

10. The linkage mechanism as recited in claim 9, further comprising:
a third linkage, pivoted to the first linkage; and
a fourth linkage, pivoted to the driving element and the third linkage.

11. The linkage mechanism as recited in claim 1, wherein the second end portion and the fourth end portion are respectively pivoted to the driving element, the third end portion is pivoted to the base, and the linkage mechanism further comprises:
a third linkage, pivoted together with the fourth end portion to a same position of the driving element;
a fourth linkage, pivoted together with the first end portion to a same position of the base; and
a linking element, wherein the third linkage and the fourth linkage are respectively pivoted to the linking element.

12. The linkage mechanism as recited in claim 1, wherein the driving element comprises:
a handle; and
a gear set, wherein the handle is coupled to at least one of the second end portion and the fourth end portion through the gear set.

13. The linkage mechanism as recited in claim 12, wherein the gear set comprises:
a first gear, connected with the handle;
a second gear, coupled to the first gear;
a third gear, connected with the fourth end portion and coupled with the second gear; and
a fourth gear, connected with the second end portion and coupled with the third gear.

14. The linkage mechanism as recited in claim 12, wherein the driving element further comprises a holder, and the handle and the gear set are respectively pivoted to the holder.

15. The linkage mechanism as recited in claim 14, wherein the gear set is configured to drive the third end portion of the second linkage to both move and rotate relative to the base when the handle rotates relative to the holder, so as to move the third end portion away from the first end portion.

16. The linkage mechanism as recited in claim 12, wherein the linking element and the riding element thereon presents non-horizontal when the handle is in a first position, and the linking element and the riding element thereon presents horizontal when the handle is rotated to a second position from the first position.

17. The linkage mechanism as recited in claim 12, wherein the linkage mechanism further comprises a first angle between the second end portion of the first linkage and the fourth end portion of the second linkage when the handle is in a first position, a second angle between the second end portion of the first linkage and the fourth end portion of the second linkage when the handle is in a second position, and the second angle is greater than or equal to the first angle.

18. A walking aid device, comprising:
a wheel set; and
a linkage mechanism, comprising:
a base, wherein the wheel set is pivoted to the base;

a first linkage, having a first end portion and a second end portion opposite to each other, wherein the first end portion is pivoted to the base;
a second linkage, having a third end portion and a fourth end portion opposite to each other, wherein the third end portion is coupled to the base, and the second end portion and the fourth end portion are coupled with each other; and
a driving element, rotatably coupled to at least one of the second end portion and the fourth end portion, and the driving element is configured to rotatably drive both of the first linkage and the second linkage to rotate relative to the base.

19. The walking aid device as recited in claim 18, wherein the base has a first sliding guide portion, and the third end portion of the second linkage is slidably disposed in the first sliding guide portion.

20. The walking aid device as recited in claim 19, wherein the linkage mechanism further comprises:
a linking element, pivoted to the second linkage, wherein the linking element has a second sliding guide portion, the first linkage further has a coupling portion located between the first end portion and the second end portion, and the coupling portion is slidably disposed in the second sliding guide portion; and
a riding element, connected with the linking element.

21. The walking aid device as recited in claim 20, wherein the coupling portion is configured to move in the second sliding guide portion when the first linkage rotates relative to the base, so as to drive the linking element to rotate relative to the second linkage, thereby changing a tilt angle between the linking element and the riding element thereon.

22. The walking aid device as recited in claim 19, wherein the linkage mechanism further comprises:
a linking element, pivoted to the first linkage, wherein the second linkage is a retractable rod and has a second sliding guide portion, the linking element has a coupling portion, and the coupling portion is slidably disposed in the second sliding guide portion; and
a riding element, connected with the linking element.

23. The walking aid device as recited in claim 18, wherein the second linkage has a first rod member and a second rod member pivoted to each other, the first rod member has the third end portion, the second rod member has the fourth end portion, the linkage mechanism further comprises a linking element and a riding element, the third end portion is coupled to the linking element and coupled to the base through the linking element, and the riding element is connected with the second rod member.

24. The walking aid device as recited in claim 23, wherein the base has a first sliding guide portion, the linking element has a first coupling portion, a second coupling portion and a second sliding guide portion located between the first coupling portion and the second coupling portion, the first linkage further has a third sliding guide portion located between the first end portion and the second end portion, the first coupling portion is slidably disposed in the first sliding guide portion, the second coupling portion is slidably disposed in the third sliding guide portion, and the third end portion is slidably disposed in the second sliding guide portion.

25. The walking aid device as recited in claim 18, wherein the second linkage has a first rod member and a second rod member pivoted to each other, the first rod member has the third end portion, the second rod member has the fourth end portion, the third end portion is pivoted to the base, and the linkage mechanism further comprises a riding element connected with the second rod member.

26. The walking aid device as recited in claim 18, wherein the linkage mechanism further comprises:
a linking element, wherein the second end portion and the fourth end portion are respectively pivoted to the linking element, and the third end portion is pivoted to the base.

27. The walking aid device as recited in claim 26, wherein the linkage mechanism further comprises:
a third linkage, pivoted to the first linkage; and
a fourth linkage, pivoted to the driving element and the third linkage; and
a riding element, connected with the third linkage.

28. The walking aid device as recited in claim 18, wherein the second end portion and the fourth end portion are respectively pivoted to the driving element, the third end portion is pivoted to the base, and the linkage mechanism further comprises:
a third linkage, pivoted together with the fourth end portion to a same position of the driving element;
a fourth linkage, pivoted together with the first end portion to a same position of the base;
a linking element, wherein the third linkage and the fourth linkage are respectively pivoted to the linking element; and
a riding element, connected with the linking element.

29. The walking aid device as recited in claim 18, wherein the driving element comprises:
a handle; and
a gear set, wherein the handle is coupled to at least one of the second end portion and the fourth end portion through the gear set.

30. The walking aid device as recited in claim 29, wherein the gear set comprises:
a first gear, connected with the handle;
a second gear, coupled to the first gear;
a third gear, connected with the fourth end portion and coupled with the second gear; and
a fourth gear, connected with the second end portion and coupled with the third gear.

31. The walking aid device as recited in claim 29, wherein the driving element further comprises a holder, and the handle and the gear set are respectively pivoted to the holder.

32. The walking aid device as recited in claim 29, wherein the linking element and the riding element thereon presents non-horizontal when the handle is in a first position, and the linking element and the riding element thereon presents horizontal when the handle is rotated to a second position from the first position.

33. The walking aid device as recited in claim 29, wherein the linkage mechanism of the walking aid device further comprises a first angle between the second end portion of the first linkage and the fourth end portion of the second linkage when the handle is in a first position, a second angle between the second end portion of the first linkage and the fourth end portion of the second linkage when the handle is in a second position, and the second angle is greater than or equal to the first angle.

34. The walking aid device as recited in claim 31, wherein the gear set is configured to drive the third end portion of the second linkage to both move and rotate relative to the base when the handle rotates relative to the holder, so as to move the third end portion away from the first end portion.

* * * * *